(12) United States Patent
Ganesan

(10) Patent No.: US 12,172,688 B2
(45) Date of Patent: Dec. 24, 2024

(54) SYSTEM AND METHOD FOR MANAGING THE MOVEMENT OF A VEHICLE ALONG A TRANSPORT NETWORK

(71) Applicant: ALSTOM Holdings, Saint-Ouen sur-Seine (FR)

(72) Inventor: Muniandi Ganesan, Tamilnadu (IN)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 151 days.

(21) Appl. No.: 17/444,258

(22) Filed: Aug. 2, 2021

(65) Prior Publication Data
US 2022/0041193 A1  Feb. 10, 2022

(30) Foreign Application Priority Data

Aug. 7, 2020  (IN) .............................. 202041034001

(51) Int. Cl.
| | |
|---|---|
| *B61L 3/10* | (2006.01) |
| *B61L 1/02* | (2006.01) |
| *B61L 3/12* | (2006.01) |
| *B61L 15/00* | (2006.01) |

(52) U.S. Cl.
CPC ................... *B61L 3/10* (2013.01); *B61L 1/02* (2013.01); *B61L 3/126* (2013.01); *B61L 15/0058* (2024.01)

(58) Field of Classification Search
CPC .. B61L 3/10; B61L 3/006; B61L 3/126; B61L 1/02
See application file for complete search history.

(56) References Cited

U.S. PATENT DOCUMENTS

| | | | |
|---|---|---|---|
| 11,050,849 B1* | 6/2021 | Floyd | B60W 50/045 |
| 2012/0316717 A1* | 12/2012 | Daum | B60L 53/63 701/22 |
| 2018/0205216 A1* | 7/2018 | Van Der Poel | B61L 23/30 |

FOREIGN PATENT DOCUMENTS

WO   2008/073548 A2   6/2008

* cited by examiner

*Primary Examiner* — Adam D Tissot
(74) *Attorney, Agent, or Firm* — Knobbe, Martens, Olson & Bear, LLP

(57) ABSTRACT

A system and a related method are for managing the movement of a vehicle travelling along a transport network and powered by a power line which is segmented into a plurality of power feeding segments. At least one power feeding controller is configured at least to control switching ON/OFF a predetermined number of power feeding segments. An on-board control system is installed on board of said vehicle. At least one trackside control system is operatively connected to the on-board control system and the at least one power feeding controller.

12 Claims, 4 Drawing Sheets

| Smart | For current Smart contract | | | | | | | | Links between two contracts/Blocks |
|---|---|---|---|---|---|---|---|---|---|
| Hash code (128 bits) | Smart Contract Type (4 bits) | Time of creation (Sec) (32 bits) | Time Validity (Sec) (32 bits) | Identification Master Node (16bits) | Number of Nodes (N) (16 bits) | Identification of Nodes (32 bits * N) | Data Size (32 bits) | Data/Smart Contract to be executed | Hash code of next Smart Contract or Block (128 bits) |
| MD5 checksum of current smart contract | 1. Trackside Power (0001) 2. Movement Authority (0010) 3. Onboard Energy (0011) | Time | Time | Id of Trackside ATC | Onboard ATC (1) + Number of Power Supply Control Units (1...P) | Id (N=1, 32 bits) | Actual Size of Data/ Smart Contract | 1. Segment to be Powered ON or OFF (S1, !S2, !S3) 2. Stopping and Intermediate Location Points with arrival time 3. 1-USE/0 DON'T USE | MD5 checksum of next smart contract |
| MD5 checksum of current smart contract Links between two transactions | | | | | | | | | Zeros (For end of message) (OR) MD5 checksum of next Block |
| | Time limit for smart contract | | Blockchain master nodes bound by "Smart Contract" | | List of Blockchain nodes bound by "Smart Contract" | | | | |

FIG. 4

SYSTEM AND METHOD FOR MANAGING THE MOVEMENT OF A VEHICLE ALONG A TRANSPORT NETWORK

CROSS-REFERENCE TO RELATED APPLICATION

This application claims priority to Indian patent application No. 202041034001 filed on Aug. 7, 2020, the disclosure of which including the specification, the drawings, and the claims is hereby incorporated by reference in its entirety.

FIELD OF THE INVENTION

The present invention concerns a system and a method for managing the movement of a vehicle while travelling along a transport network and which is fed by a power line segmented into a plurality of power feeding segments.

BACKGROUND OF THE INVENTION

The system and method according to the invention are particularly suitable to be used in connection with a railway line powered by a third contact rail, used for example to feed metro trains, and they will be described hereinafter by making particular reference to such application, without intending in any way to limit their possible application to other types of electrically powered transport networks, be them railways, like tramways, metro lines, or roadways, e.g. trolleybus lines, bus lines et cetera.

In the field of transportation is known the use of power lines for electrically feeding vehicles travelling along a power line.

An example of such power lines is the so-called third rail which is used to feed for example metro trains or trams and is installed along the transport network for instance on an external side of the rail track close to a rail.

Nowadays, in order to prevent that power is continuously fed into a third rail irrespective of the presence and movement of vehicles, third rails are usually divided in segments which can be selectively powered only when needed, i.e. when a vehicle is travelling over them.

The use of a segmented third rail however still presents some aspects worth of further improvements.

For example, in tramways fed with a segmented third rail, a rule of line of sight is used, namely the electrification occurs only on track segments directly underneath the tram and when a tram arrives over a certain power feeding segment, a power control system devoted to control and command to power ON such segments detects the presence of the vehicle and receives a safety coded signal from the vehicle, which is decoded. Then, the safety and functional logic module of the power control system performs the actuation of power contactors to deliver the power to the relevant segment(s). These steps of receiving and decoding the signal from the vehicle, and then executing all safety and functional logics for switching on the power on the segment(s), require an "actual switching time". This "actual switching time" is preset and almost "constant" and does not vary relative to the current speed of the vehicle; further, the power contactors operate only when the current collector of the vehicle is in a neutral zone of the segment, i.e. they don't switch ON during high charge in the conductive segment so as to reduce the strain of the components. This entails that the power box has only a "constant" distance, usually in the order of few meters, e.g. 3 m, before the vehicle can enter into the truly conductive part of the segment. Clearly, since a vehicle can travel at different speeds, the "available switching time" can vary, for example for a segment of 11 m including a neutral zone of 3 m, from about 272 ms at a speed of 40 km/h to 70 ms for a vehicle travelling at 160 km/h.

Hence, when the speed increases, there could be situations where the available switching time may not sufficient and thus it would be necessary to limit the speed of travelling vehicles in order to prevent powering problems, or it is necessary to redesign the power control system for modifying the preset "actual switching time".

Another solution foresees instead to modify the position of current collectors onboard, and in particular the mutual distance between two consecutive current collectors in case of trams, thus entailing some expensive constructive modifications to the vehicles.

SUMMARY OF THE INVENTION

The present invention is aimed at mitigating at least partially the above indicated issues, and in particular to provide a solution which allows, compared to known solutions, to better manage and integrate the movement of and related power delivery for a vehicle travelling over a transport network and powered by a segmented power supplying line.

This aim is achieved by a system for managing the movement of a vehicle travelling along a transport network and powered by a power line which is segmented into a plurality of power feeding segments, the system comprising:
  at least one power feeding control unit (controller) configured at least to control switching ON/OFF a predetermined number of power feeding segments;
  an on-board control system installed on board of said vehicle;
  at least one trackside control system which is operatively connected to said on-board control system and said at least one power feeding control unit; characterized in that said trackside control system is configured at least to generate:
  a first set of movement instructions to be executed by said on-board control system for the vehicle to reach and travel over said predetermined number of power feeding segments, said first set of movement instructions including one or more first bounding instructions indicative of a time frame within which said first set of movement instructions has to be executed; and, based on said first set of movement instructions;
  a second set of powering instructions to be executed by said at least one control unit (controller) to switch ON one or more of said predetermined number of power feeding segments for powering the vehicle when transiting over the one or more power feeding segments switched ON, said second set of powering instructions including one or more second bounding instructions indicative of a time frame within which said one or more power segments have to be switched ON.

The above mentioned aim is also achieved by a method for managing the movement of a vehicle travelling along a transport network and powered by a power line which is segmented into a plurality of power feeding segments, the method being characterized in that it comprises at least the following steps:
  (a): generating, via at least one trackside control system, a first set of movement instructions, to be executed by an on-board control system installed on board of said vehicle, for the vehicle to reach and travel over a predetermined number of power feeding segments, said first set of movement instructions including one or more first bounding instructions indicative of a time frame within which said first set of movement instructions has to be executed; and, based on said first set of movement instructions:

(b): further generating, via the trackside control system, a second set of powering instructions to be executed, by at least one control unit configured at least to control switching ON/OFF of said predetermined number of power feeding segments, to switch ON one or more of said predetermined number of power feeding segments for powering the vehicle when transiting over the one or more power feeding segments switched ON, said second set of powering instructions including one or more second bounding instructions indicative of a time frame within which said one or more power segments have to be switched ON.

BRIEF DESCRIPTION OF THE DRAWINGS

Further characteristics and advantages will become apparent from the description of some preferred but not exclusive exemplary embodiments of a system and a method according to the invention, illustrated only by way of non-limitative examples with the accompanying drawings, wherein:

FIG. 4 is a table visually representing an exemplary definition of a Smart Contract/Block/Blockchain.

DETAILED DESCRIPTION OF THE PREFERRED EMBODIMENTS

Figure 1:
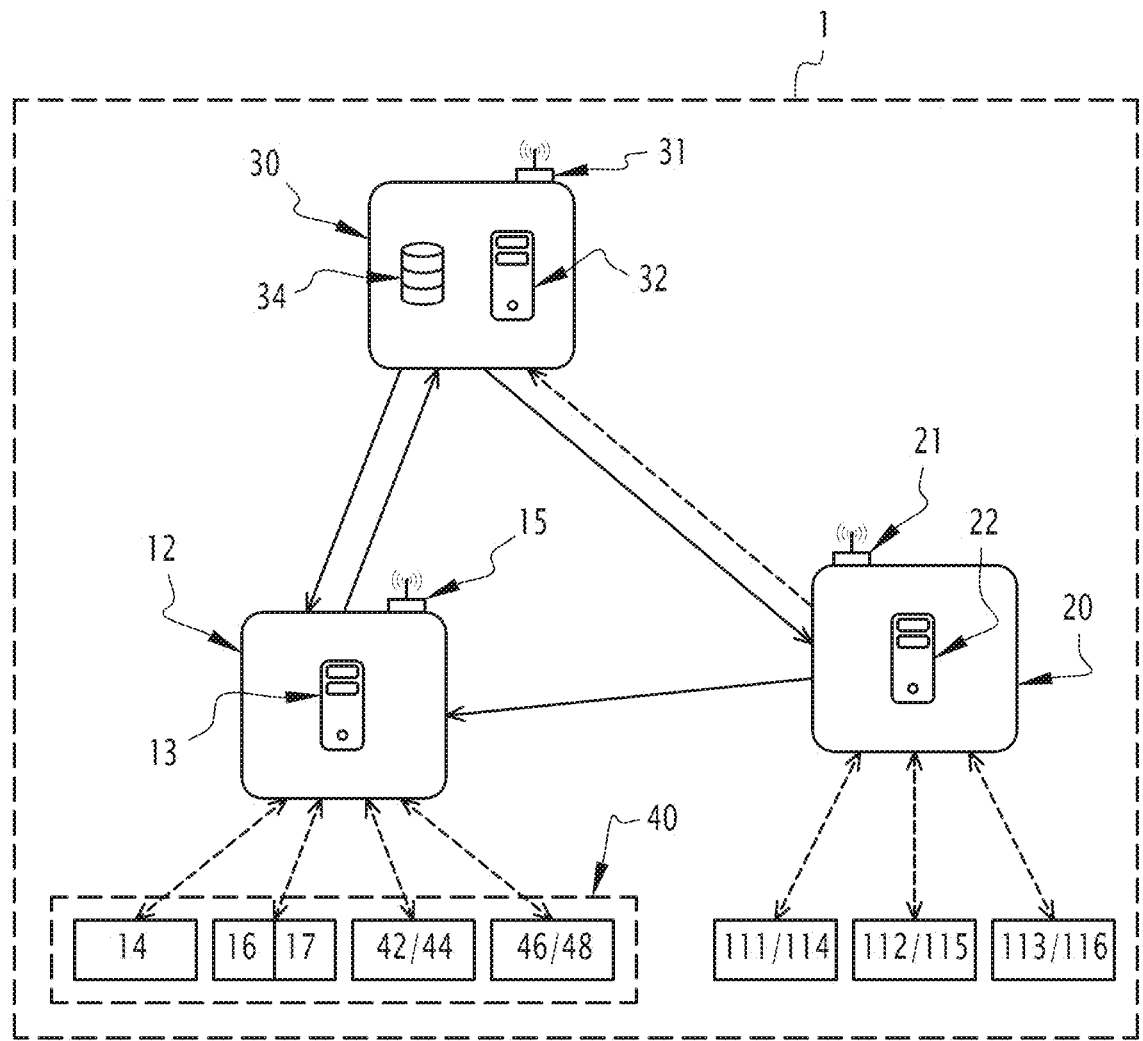
FIG. 1 is a block diagram schematically illustrating a system for managing the movement of a vehicle along a transport network according to the invention.

It should be noted that in the detailed description that follows, identical or similar components, either from a structural and/or functional point of view, may have the same reference numerals, regardless of whether they are shown in different embodiments of the present disclosure.

It should be also noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration and/or form and/or positioning.

In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

Finally, in the following description and claims, the numeral cardinals first, second, third et cetera . . . , will be used only for the sake of clarity of description and in no way they should be understood as limiting for whatsoever reason; in particular, the indication of a component referred to for instance as the "third . . . " does not imply necessarily the presence or strict need of the preceding "first" or "second" ones, unless such presence is clearly evident for the correct functioning of the subject switch machine, nor that the order should be the one described in the illustrated exemplary embodiment(s).

Figure 2:
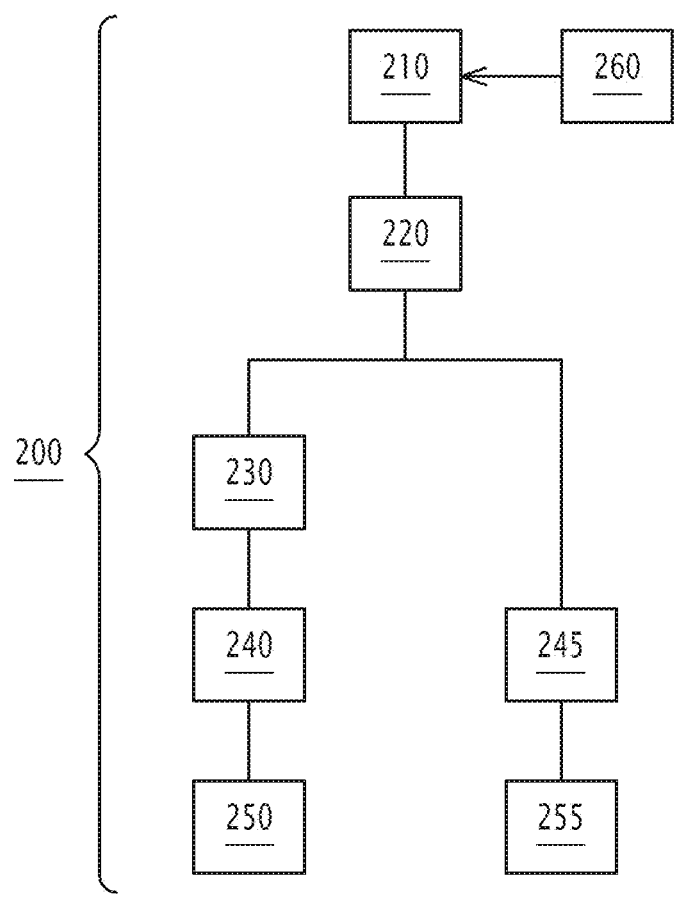
FIG. 2 is a flow chart schematically illustrating a method for managing the movement of a vehicle along a transport network according to the invention.

FIGS. 1 and 2 illustrate a system and respectively a method for managing the movement of a vehicle travelling along a transport network according to the invention, therein indicated by the overall reference number 1 and 200 respectively.

The system and method according to the invention are particularly suitable to be based on and implemented by using the blockchain technology, and they will be described hereinafter by making particular reference to such technology, without intending to limit its possible implementation with other types of suitable technologies.

Figure 3:
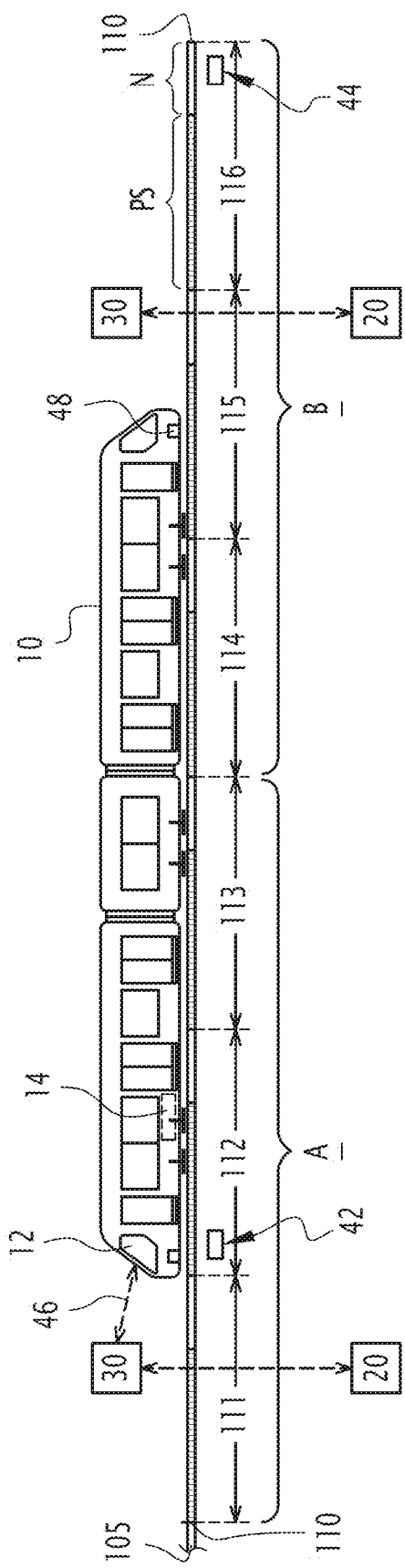
FIG. 3 schematically illustrates an exemplary application of the system of FIG. 1 applied to a railway vehicle powered by a segmented third rail.

Further, the managing system 1 and method 200 according to the invention can be used in connection with any suitable type of vehicle which can be fed electrically, an example of which is illustrated in FIG. 3 in the schematic form of a tram 10, travelling along a transport network 105 and powered by a segmented third rail 110.

Hence, as those skilled in the art would easily appreciate, the term vehicle herein used encompasses any suitable type of vehicle, such vehicle, for instance metro trains, trams, or buses trolley bus, cars et cetera, and the segmented third rail 110 can be constituted by any other suitable type of power line properly segmented, e.g. an aerial power line.

In the exemplary embodiment illustrated in FIG. 3, the transport network 105, which comprises the associated third rail 110, is illustrated divided into one or more zones, only two of which are schematically represented in FIG. 3, namely a first zone A and an adjacent second zone B.

The number of line zones can be based on a number of different variants; for example, in the case of a railway line, the variants can include signals varying in real time from red to green and vice versa, point machines varying from normal to reverse status and vice versa, blocks varying from occupied to non-occupied and vice versa, et cetera.

The illustrated third contact rail 110 is segmented into power segments, and for each zone of the transport network 105 there are included one or more power feeding segments.

For instance, in the example illustrated in FIG. 3, the first zone A includes three power feeding segments 111, 112, 113, and the second zone B includes also three power feeding segments 114, 115, 116. As illustrated only for the power feeding segment 116, each of the illustrated segments is composed by a neutral part N, having for example a length of 3 m, and a power supplying part PS, having for example the length of 8 m.

Clearly, the number of power feeding segments for each zone, as well as the length of each segment and where present, of its neutral and power supplying parts, can be modified based on the applications and/or specific needs.

As illustrated in FIG. 1, the system 1 according to the present invention comprises at least one trackside power feeding control unit 20 which is installed along the transport network 105 and is configured at least to control switching ON/OFF of a predetermined number of power feeding segments.

In the example schematically represented in FIG. 3, there are illustrated only two power control units 20, out of which a first one is devoted to control the three power segments 111, 112 and 113 of the first zone A, and the second one is devoted to control the three power segments 114, 115 and 116 of the second zone B.

Clearly, each of the power feeding control units 20 can be devised to control a different number of power feeding segments, and each zone can comprise a different number of power feeding control units 20.

In the following, reference will be made only to one power feeding control unit 20 for ease of description, and what described for one power feeding control unit 20 has to be understood as applicable to all power feeding control units 20 installed along the transport network 105.

The system 1 comprises also, installed on board of the vehicle 10, an on-board control system 12.

Further, according to one possible embodiment, the system 1 comprises also at least one rechargeable power storing unit (storage) 14 which is configured to collect and store power while the vehicle 10 is travelling along the transport network 105.

According to solutions well known or readily available to those skilled in the art and therefore not described herein in details, in case of a train, the on-board control system 12 comprises a control and processing unit 13 which comprises the automatic train operation (ATO) system suitable for automating the operations of the train 10 itself, and an onboard navigation software module adapted for driving the vehicle 10.

Likewise, for other vehicles, the on-board control system 12 comprises an equivalent control and processing unit 13, for automatic navigation, e.g. driverless vehicles, or in any case for assisted automatic navigation.

Usefully, the system 1 according to the invention comprises at least one trackside control system 30 which is installed along the transport network 105 and is adapted to control at least one zone of the transport network 105, and in particular the power feeding control units(s) 20 installed in its line zone of responsibility.

In the example schematically represented in FIG. 3, there are illustrated two trackside control systems 30, out of which a first one is devoted to control the first zone A and the second one is devoted to control the second zone B.

Each trackside control system 30 is arranged to operatively connect to the onboard control system 12 of transiting vehicles 10, and to each of the power feeding control units 20 installed within its zone of responsibility.

To this end, each trackside control system 30 comprises a communication device 31, each power feeding control unit 20 comprises a communication device 21, and the onboard control system 12 comprises an own communication device 15.

The communication between the trackside control system 30 and the onboard control system 12 is realized in a wireless manner, while the communication between each trackside control system 30 and the respective power feeding control unit(s) 20 operatively associated to it can be realized in a wired or wireless manner.

In practice, within each zone assigned, each trackside control system 30 acts as a master node and, as it will become more apparent from the following description, it controls the overall movement of transiting trains, the onboard energy usage and the power feeding control unit(s) 20 within the same zone which act as slave-nodes.

In the following, reference will be made only to one trackside control system 30 controlling one power feeding control unit 20 for ease of description, i.e. the one controlling the first zone A, and what described has to be understood as applicable to all trackside control system 30 installed along the transport network 105, and each controlling any possible number of power feeding control units 20 installed within the zone each corresponding trackside control system 30 is assigned and responsible for.

Conveniently, the trackside control system 30, which comprises for example a control and processing unit 32, is configured at least to generate, preferably in advance, namely before the vehicle 10 reaches the relevant power feeding segments 111, 112, 113 installed within its zone of responsibility A, a first set of movement instructions to be executed by the on-board control system 12 so that the approaching vehicle 10 reaches and travels over the portion of the first zone A and is then timely powered by the predetermined number of power feeding segments 111, 112 and 113. In particular, the first set of movement instructions includes one or more first bounding instructions indicative of a time frame within which the first set of movement instructions has to be executed.

Usefully, the trackside control system 30 is configured also to generate, based on the first set of movement instructions generated, a second set of powering instructions to be executed by the at least one control unit 20 to switch ON one or more of the predetermined number of power feeding segments 111, 112 and 113 under its control and thus timely powering a vehicle 10 when it reaches and transits over such segments switched ON. In particular, also the second set of powering instructions includes one or more second bounding instructions indicative of a time frame within which said predetermined number of power feeding segments 111, 112 and 113 has to be switched ON and thus supply the transiting vehicle 10.

Preferably, the trackside control system 30 is configured to generate at least one of, preferably both, the first set of movement instructions and the second set of powering instructions in the form of blockchain-based smart contracts.

Conveniently, the trackside control system 30 comprises a copy of the navigation software module, which is stored for example in a memory associated to and runs in the control and processing unit 32.

In practice, the trackside control system 30 comprises a "digital twin", namely a replica of the onboard navigation software along with the vehicle system model. This digital twin, e.g. comprising for a train the ATO system, allows predicting for example some outputs related to the vehicle 10, such as the distance, speed and acceleration for the movement of the vehicle 10 along different power feeding segments, e.g. in the form of stopping/intermediated location points.

According to a possible embodiment, the at least one power feeding control unit 20 is further configured to monitor the predetermined number of power feeding segments 111, 112 and 113 under its control and to output to its master trackside control system 30 a warning signal if one or more of such predetermined power feeding segments are under fault, namely they are not in condition to properly deliver the power requested to feed the transiting vehicle 10.

According to this embodiment, the trackside control system 30 is further configured to generate, based on the warning signal issued by the power feeding control unit 20, a third set of powering instructions to be executed by the on-board control system 12 for powering the vehicle 10, while it transits over the one or more of the predetermined power feeding segments under fault, via the energy stored in the onboard rechargeable power storing unit 14.

In particular, also the third set of powering instructions includes one or more third bounding instructions indicative of a time frame within which the vehicle 10 has to be fed with the power stored onboard and replacing the one or more predetermined power feeding segments under fault.

According to yet another embodiment, the trackside control system 30 is further configured to generate, based on a signal issued by the on-board control system 12 requesting to use the energy stored in the onboard rechargeable power storing unit 14, a third set of powering instructions to be executed by said on-board control system 12 for powering the vehicle 10 via the energy stored in the rechargeable power storing unit 14; also in this case, the third set of powering instructions includes one or more third bounding instructions indicative of a time frame within which the vehicle 10 has to be fed with the power stored onboard.

In this way, it is possible to improve the overall efficiency of the powering system and to prevent waste of available energy; for example, it is possible to discharge the power storage unit 14, thus saving power from the third rail 110, and to empty the storage unit 14 before the vehicle 10 enters into a braking mode where regenerative power is available and can be stored, for later use, in the emptied space made available in the storage unit 14 instead of wasting it.

Preferably, the trackside control system 30 is configured to generate also the third set of powering instructions in the form of blockchain-based smart contracts.

According to an embodiment, the system 1 further comprises at least one localizing device, schematically indicated in FIG. 1 by the reference number 40, which is configured to provide signals indicative of the actual position of the vehicle 10 along the transport network 105 to at least one of the on-board control system 12 and the trackside control system 30.

According to this embodiment, the trackside control system 30 is configured to generate the first and/or second set of instructions and or to modify a previously generated first and/or second set of instructions in real time based on a signal, received from the at least one localizing device 40, which is indicative of the actual localization of the vehicle 10 along the transport network 105 and also on a predetermined travelling time schedule defined for the vehicle 10; the predetermined travelling time schedule can be defined, for example for a train or a tram, by a central supervising center of a larger railway network to which the network 105 is part of.

According to a possible embodiment, the at least one localizing device 40 comprises:
  a plurality of trackside beacons which are installed, along the transport network 105, spaced apart from each other. In the example illustrated in FIG. 3, there are schematically represented only two trackside beacons 42 and 44; and
  at least one beacon antenna which is installed on board of the vehicle 10; in case of long vehicle, such as trains or trams, there are provided for example two antennas, namely a first beacon antenna 46 and a second beacon antenna 48 which are installed on board of the vehicle 10, for instance at a front part and at a respective rear part thereof.

According to this embodiment, the trackside control system 30 comprises a database 34, or beacon database, storing data indicative of the identification and positioning of each trackside beacon 42, 44, installed along the transport network 105.

In particular, such database 34 contains one or more data including but not limited to: for each trackside beacon its identification data (hereinafter ID°) and its location, for example at a station, or interstation, distance from the departing station; identification data or ID for each track of the transport network 105; identification data or ID for each station of the transport network 105; list of next Upcoming beacon IDs with related distance.

Further, the on-board control system 12 comprises an accelerometer 16 which is adapted to detect, e.g. continuously, the actual acceleration of the vehicle 10 and to provide corresponding signals indicative of such actual acceleration as an input into a software module 17, for instance an extended Kalman filter, which is configured to calculate, based at least on the signals provided by the accelerometer 16, the actual distance travelled by the vehicle 10 with reference to a previously identified trackside beacon 42, 44 before reaching the following beacon along the line 105.

As previously indicated, FIG. 2 is a flow chart schematically illustrating a method for managing the movement of a vehicle 10 along a transport network 105, which can be carried out for example in connection with the system 1.

In particular, the method 200, comprises at least the following steps:
  210: generating, for example via the at least one trackside control system 30 a first set of movement instructions to be executed by an on-board control system, like the on-board control system 12 installed on board of the vehicle 10 to reach and travel over a predetermined number of power feeding segments 111, 112, 113, wherein the generated first set of movement instructions includes one or more first bounding instructions indicative of a time frame within which said first set of movement instructions has to be executed; and,
  220: further generating, for example via the same trackside control system 30 and based on the first set of movement instructions generated, a second set of powering instructions to be executed, by at least one control unit 20 configured at least to control switching ON/OFF of said predetermined number of power feeding segments, to switch ON one or more of said predetermined number of power feeding segments for powering the vehicle 10 when transiting over the one or more power feeding segments switched ON, said second set of powering instructions including one or more second bounding instructions indicative of a time frame within which said one or more power segments have to be switched ON.

Preferably the first set of movement instructions and the second set of powering instructions are generated before the vehicle 10 reaches the predetermined number of power feeding segments.

According to an embodiment, the method 200 further comprises the steps of:
  230: monitoring, via the at least one control unit 20, said predetermined number of power feeding segments 111, 112, 113;
  240: outputting, to said trackside control system 30, a warning signal if one or more of the predetermined power feeding segments monitored are under a fault condition and cannot be powered on and thus deliver power to the transiting vehicle 10;
  250: generating, via said trackside control system 30, and based on said warning signal a third set of powering instructions to be executed by said on-board control system 12 for powering the vehicle 10, while it transits over the one or more of the predetermined power feeding segments under fault, via the energy stored in the onboard rechargeable power storing unit 14, wherein the third set of powering instructions includes one or more third bounding instructions indicative of a time frame within which the vehicle has to be fed with the power stored on on-board and replacing the one or more of predetermined power feeding segments under fault.

In one possible embodiment, the method 200 comprises the step 245 of issuing, by the on-board control system 12, a request to said trackside control system 30 to use the energy stored in an onboard rechargeable power storing unit, such as the unit 14, for not powering one or more of said predetermined power feeding segments 111, 112, 113, which is followed by a step 255 of generating the above indicated third set of powering instructions with the related third bounding instructions based on the request issued by the on-board control system 12 voluntary requesting to use the power already stored on board for feeding the vehicle 10. At the same time, trackside control system 30 requests the corresponding power feeding control unit 20 not to power on the power feeding segments 111, 112, 113 with the updated second set of powering instructions according to step 220.

Usefully, the method 200 further comprises the step 260 of localizing, for example via at least one localizing device 40, the actual position of the vehicle 10 along the transport network 105 and sending a corresponding signal indicative of the actual localized position to at least one of the on-board control system and the trackside control system.

According to this embodiment, the steps above described 210, 220 comprise generating the first and/or second set of instructions and or modifying a previously generated first and/or second set of instructions in real time based on the received signal indicative of the actual localization of the vehicle 10 along the transport network 105 and on a predetermined travelling time schedule defined for said vehicle 10, for example by a remote central control center.

A practical example of managing the movement and related powering of a vehicle via a system 1 and method 200 according to the invention will be now described by making particular reference to their implementation using the blockchain technology and application to a metro train or tram.

To this end, each trackside control system 30 constitutes a blockchain master node for a zone or part thereof assigned to it and within which it controls, in an integrated way, the overall movement of vehicles 10, the usage on the energy available onboard, and the trackside power feeding control units 20 installed within this zone of responsibility.

For each master node, the onboard control system 12 of each vehicle 10 running in the corresponding zone assigned (identifiable for example as "1 . . . . T", "2 . . . . T" et cetera), and all the power feeding control units 20 installed in the assigned zone (identifiable for example as "1 . . . . P", "2 . . . . P" et cetera) constitute the blockchain nodes assigned to the master node; the one or more power feeding segments (identifiable for example as "1 . . . . N", "2 . . . . N" et cetera) assigned to each of these power feeding control units 20, and the power storage unit 14 of each vehicle 10 travelling in the assigned zone (identifiable for example as "1 . . . . OESU", "2 . . . . OESU" et cetera) constitute the blockchain sub-nodes.

The codes used, e.g. "1 . . . . P", "2 . . . . P", "1 . . . . T", "1 . . . . N" et cetera, identifies the blockchain nodes and allow to differentiate the smart contract execution engine(s) which intelligently execute smart contracts according to the product configuration. Each execution engine can perform additional tasks, such as the transmission of data to other nodes, the transmission of consensus data to other nodes, et cetera.

The definition of a Smart Contract/Block/Blockchain is for example represented visually in the table shown in FIG. 4.

In practice, it is possible to have for example a maximum of 1024 smart contracts in each message which is defined as the "block". If the number of smart contracts per message exceeds the maximum, the blockchain-message is created between two blocks i.e. a Hash code of next smart contract will not be set as zero; instead, it will have the actual Hash code of a next smart contract. A blockchain Smart subcontract includes the status of the power feeding segments to be set at trackside, and the usage status of the onboard energy to be set onboard. The MD5 checksum based "Hash code" is used as the link between two blockchain smart contracts.

Hence, as illustrated in the table above, each "smart contract" contains:

- a hashcode (128 bits) which is based on MD5-Message Digest 5 checksum. It is calculated for a "smart contract type" to "Data", and any other less computationally intensive hash code can be also used;
- a smart contract type (4 bits), wherein according to the invention there are basically provided three types of smart contracts, namely Type-1 or "Trackside Power", Type-2 or "Movement Authority", and Type-3 or "Onboard Energy";
- a time of creation (32 bits), namely the time at which the relevant smart contract is created. This is used to check the freshness of the smart contract record;
- the time validity (32 bits) which defines the time bounding time frame, namely the time limit after which the smart contract issued by the trackside control system 30 becomes invalid. This information is in particular constructed based on the "digital twin" model of each onboard automatic navigation algorithm, as copied and available in the trackside control system 30;
- identification (ID) of the master node (16 bits) which helps the smart contract execution engine to identify the associated master node-trackside control system 30, to which each onboard control system 12 sends its localization reports and the status of its onboard power storing unit 14;
- the number of nodes (N) (16 bits) associated with the relevant smart contract. For a 'Trackside Power' smart contract, it is possible to have one vehicle and single or multiple power feeding control units 20 as nodes. For an 'Onboard Energy' smart contract, and for a 'Movement Authority' smart contract only the vehicle ID can be sufficient;
- the identification of nodes (32 bits*nodes), which contains information about the vehicle ID and the list of power feeding control units 20 which are bound by the relevant smart contract;
- the data size (32 bits) indicating the size of the actual smart contract;
- the smart contract to be executed which has a variable size. For example, for a Type-1 smart contract, the data are "power feeding segment to be powered ON or OFF", such as: "S1, !S2, !S3", where, S1, S2 and S3 are power feeding segments and the symbol "!" indicates the power feeding to be powered OFF or not to be powered ON. For a Type-2 smart contract, data are: stopping and intermediate location points with arrival time. They are given with reference to a trackside beacon ID and the distance from this beacon, such as: list of (speed limit, beacon ID, distance from beacon, list of associated power feeding segments). When the speed limit is zero, then it is considered as a "stopping point". The speed limit is derived based on a permanent speed limit, and/or a temporary speed limit, a maximum line speed limit, a mode speed limit (e.g. for a train traction, braking and coasting), et cetera. For a Type-3 smart contract, the information to be used on board is set as "1—USE" or by default as "0—Don't USE";

the Hash code of a next smart contract (128 bits) which is constructed by adding the hash code of a next smart contract. It is defined with zeros for the end of smart contracts in the message. In case of a chain of two or more blocks, it is constructed by adding the hash code of the next block in case.

In practice, when a vehicle like a metro train 10 enters into service for the first time of day, e.g. moving from a depot to a starting station, the trackside control system 30 of the first zone may generate or may have already generated in advance the first set of movement instructions and the second set of powering instructions, for example based just on the predefined time table for the train, which includes for instance its origin and destination stations, along with arrival and departure time at each specific station.

According to a possible embodiment, the trackside control system 30 of the first zone can generate such instructions or modify the instructions previously generated, via a signal indicative of the actual localization of the vehicle 10 along the transport network. In particular, to this end, the vehicle 10 looks for the nearest trackside beacon to localize it. At the nearest trackside beacon, for example the trackside beacon 42, the distance from this beacon is set as "zero". With this data, a train localization report is created by the onboard control system 12, for example along with the actual travelling mode, i.e. a "traction" mode.

In particular, each onboard control system 12 sends its localization report for both the head and the tail of its train 10 to the relevant trackside control system 30 in the form of messages, which include for example the trackside beacon ID, the distance from the trackside beacon, the vehicle actual mode, head/tail; the actual modes of the train includes for example a traction mode, an electrical braking mode where regenerative power is stored into the storing unit 14, a mechanical braking mode, coasting mode without any external power, during which the vehicle 10 runs by means of inertia due to prior running speed/acceleration.

Then, the trackside control system 30 generates the above indicated set of instructions in the form of smart contracts.

In particular, the trackside control system 30 maintains the list of power feeding control units 20 under its control along with their power feeding segments, 111, 112, 113, 114, 115, 116 in the form of distributed ledgers-"Trackside Power". The same ledger is distributed into the respective power feeding control units 20 in order to ensure the integrity of them i.e. the trackside control system 30 cannot update the ledger without updating also the corresponding ledger(s) of the relevant power feeding control units 20. For example, such ledgers "Trackside Power" include the identification ID of the relevant power feeding control units 20, the list of power segments associated to each relevant power feeding control unit 20, the relevant trackside beacon ID, and the distance from the relevant trackside beacon.

The trackside control system 30 maintains the list of the stopping points at the stations and the list of intermediate location points in interstation in the form of ledgers-"Movement Authority".

For example, such ledgers "Movement Authority" include, for the stopping point, the stopping point ID, the relevant trackside beacon ID, the distance from the relevant trackside beacon ID, and for the intermediate location points, the intermediate location point ID, the relevant trackside beacon ID, the distance from the relevant trackside beacon ID.

In practice, the ledgers are linked with a fixed configuration of the transport network parameters such as the stopping points, the intermediate location points, and power parameters, such as power feeding segments along the transport network.

Using the ledgers, the smart contracts are created.

More in details, based on the distributed ledgers "Movement Authority", the real time information related to the time table scheduled for the train 10 (and also for all the vehicles running in the zone of competence) by the remote control center, and preferably also based on the actual localization of the vehicle 10 along the transport network 105 provided by the onboard control system 12, the trackside control system 30 generates a smart contract "Movement Authority", which contains in other words the first set of movement instructions to be executed by the onboard control system 12 in order to respect the time table defined for the vehicle 10. The smart contract "Movement Authority", which can assume for example the form of a message including a list of speed limits, relevant trackside beacon(s) ID, distance from the relevant trackside beacon(s) ID, list of associated power feeding segments, is sent to the onboard control system 12, for example through wireless communication, which decides on the driving profile or driving automation to be followed.

Then, with the help of ledgers "Trackside Power" and based on and for each smart contract "Movement Authority" generated, one or more associated smart contracts "Trackside Power", (i.e. the second set of powering instructions) are generated for the blocks of power feeding segments to be powered ON only within the relevant bounding time frame in order to avoid the unnecessary power "live" status of other power feeding segments. In particular, in order to generate the relevant smart contract "Trackside Power", the trackside control system 30 uses its copy of the onboard ATO software along with the vehicle system digital model, which allows the trackside control system 30 to have knowledge about the traction/braking and resistance forces, such as propulsion resistance, curve resistance, gradients, tunnel resistance, et cetera, of the vehicle. As previously mentioned, the digital copy of the ATO of the train 10 allows predicting the distance, speed and acceleration of the vehicle for its movement along different power feeding segments, e.g. via stopping/intermediated location points. Each smart contract "Trackside Power" generated, for example as previously indicated in the form of "S1, !S2, !S3" is distributed by the trackside control system 30 to the onboard control system 12 and to the associated trackside power feeding control units 20. For example, the smart contract "Trackside Power" is distributed to the onboard control system 12 through wireless communication and/or to the relevant power feeding control unit(s) 20 through wireless or wired communication, substantially simultaneously. In particular, for the same smart contract "Trackside Power", the trackside control system 30 intelligently connects the respective number of power feeding segments based on the content of the ledger "Trackside Power" and sends the smart contract accordingly.

Then, each power feeding control unit 20 uses the received smart contract "Trackside Power" to switch ON/OFF the appropriate power feeding segments under its control. In addition, using the received smart contract "Trackside Power", the onboard control system 12 can check the powering ON/OFF status of the relevant power feeding segments during its movement along the line 105. In particular, each smart contract "Trackside Power" is generated in such a way that the movement of the vehicle 10 and the power ON/OFF status of the power feeding segments are timely synchronized so that no power feeding segments are powered ON once the movement of the vehicle 10 over the relevant power feeding segment is completed.

In case of one or more faulty segments, as signaled by the relevant power feeding control unit 20, or on the basis of a voluntary request issued by the onboard control system 12, the trackside control system 30 generates a smart contract "Onboard Energy", i.e. the third set of powering instructions, for the usage of the power stored in the onboard power storing unit 14. For example, as previously indicated, each smart contract "Onboard Energy" can assume the form of "1—USE" or "0—Don't USE" which is set by default as "0—Don't USE". Then, when needed, for example due to one or more faulty power segments, the smart contract "Onboard Energy" is set as "1—USE", in advance, in order to ensure the uninterruptible movement of the vehicle, and is distributed by the trackside control system 30 at least to the onboard control system 12, via wireless communication. Since one or more power feeding segments are OFF due to a faulty status, the relevant smart contract "Trackside Power" is also updated by the trackside control system 30. Accordingly, the power stored onboard is used to feed the train at least over the faulty segment(s) during the regular movement of the vehicle in traction mode.

Likewise, a smart contract "Onboard Energy" is generated based on a voluntary request issued by the onboard control system 12 to use the power stored in the storage unit 14, for example to feed the vehicle 10 for a certain distance, e.g. before entering a regenerative braking mode so as to consume the onboard energy at least partially before future regenerative energy can inflow into the power storing unit 14. Also in this case, the trackside control system 30 sends the generated smart contract "Onboard Energy" to the onboard control system 12 as the authorization to the request; at the same time, the respective trackside power feeding segments will be powered OFF using an updated smart contract "Trackside Power" suitably updated by the trackside control system 30 itself.

In addition, when the vehicle is in a "coasting mode", it proceeds by inertia and therefore it does not consume any power from the third rail 110. Hence, usefully the relevant power feeding segments can be put in a power OFF condition during this mode and the smart contract "Trackside Power" is updated accordingly by the trackside control system 30.

Similarly, when the vehicle is in a "mechanical braking mode", it does not consume any power from the third rail 110. Hence, usefully the relevant power feeding segments can be put in a power OFF condition during this mode and the smart contract "Trackside Power" is updated accordingly by the trackside control system 30.

From an execution point of view, the smart contracts are executed via execution engines at the blockchain nodes, i.e. at a master node-trackside control system 30, at the power feeding control units 20 and at the onboard control system 12.

In particular, once the smart contract "Movement Authority" is issued, the actual power ON/OFF status of the power feeding segments is required at the onboard control system 12 and at the trackside control system 30 in order to feed and move the vehicle 10 accordingly. Hence, the smart contract at the power feeding control units 20 needs to be executed first, and safe power ON/OFF status data of the power feeding segments need to be sent, almost simultaneously, to the onboard control system 12 and to the trackside control system 30. Along with the status, a read back error flag is also sent to alert about any power feeding failure. On the reception of the message of smart contract from the trackside control system 30, the hash code check is performed before using the actual data of smart contract. In case of integrity issues of the smart contract (confirmed the through hash code), the trackside control system 30 is informed in order to reissue the smart contract again. The smart contract "Trackside Power" is executed via an execution engine at the relevant power feeding control unit(s) 20. This execution at the power feeding control unit 20 is linked with the "event" of the arrival of a "Smart contract-Trackside Power" from the trackside control system 30. Upon reception, the execution engine extracts the list of power feeding segments associated with the corresponding power feeding control unit 20 and the status of the power feeding segments to be set as "ON" at first. By default, the status of all power feeding segments is set as OFF. Each control unit 20 has to set the ON status for only the associated power feeding segments which are part of the current smart contract. Then, the power feeding control unit 20 commands the expected output to be set to ON (e.g. via a relay or switch on/off signal) in the form of smart subcontracts. After a certain time limit (which is configurable at the control unit 20), the read back of the status of a power ON condition is captured. A flag is generated by comparing the expected output and actual output. Then, the actual power ON status along with error flags is sent to the respective onboard and trackside control system 12 and 30 as per the example of the smart contract "Trackside Power" above indicated.

The execution of a smart contract "Trackside Power" using an execution engine at the onboard control system 12 and at the trackside control system 30 is as follows.

The execution of the smart contract "Trackside Power" at an onboard control system 12 is linked with the "event" of the arrival of a smart contract "Trackside Power" from the trackside control system, while the execution at the trackside control system 30 is linked with the "event" of the power ON/OFF status from the power feeding control unit 20. Upon reception of this smart contract, the execution engine of the onboard control system 12 extracts the list of power feeding segments associated with it and waits for the arrival of a "third rail power segments ON/OFF status" from all the associated power feeding control units 20. Once the power feeding segments ON/OFF status 'event' is confirmed, the execution engine at both the onboard control system 12 and at the trackside control system 30 executes the smart contract to check where the vehicle 10 can proceed based on the power feeding segments status and flags received from the various power feeding control units 20. The train movement is continued with trackside power if there is no error flag set by a power feeding control unit 20 and based on the consensus from the relevant trackside control system 30. If there is an error flag set by the control unit 20 for a particular power feeding segment, or there is no consensus from the trackside control system 30, then the movement of the train is continued with the onboard energy available in the power storing unit 14. In this case, the vehicle receives from the trackside control system 30 the instructions to move further via an updated smart contract "Trackside Power" and a newly issued smart contract "Onboard Energy".

The execution of the smart contract "Movement Authority" using an execution engine at the onboard control system 12 is linked with the "event" of the arrival of the smart contract from the trackside control system 30. Upon reception, this execution engine extracts the power feeding segments associated with the movements devised for the vehicle 10 and ensures their power ON time and the status to initiate the movement based on the consensus outcome of the smart contract "Trackside Power". For the example, as above indicated, the smart contract "Movement Authority" has the form of "list of (speed limit, beacon ID, distance from beacon, list of associated power feeding segments). When the speed limit is zero, then it is considered as a "stopping point". For the non-zero speed limit, the onboard control system 12 will continue to drive the vehicle 10 with the speed limit to reach the Intermediate location points, which are defined with reference to beacons and distance information provided by the accelerometer 16.

The execution of the smart contract "Onboard Energy" using the execution engine at the onboard control system 12 is linked with the "event" of the arrival of such smart contract from the trackside control system 30. The smart contract "Onboard Energy" is often combined with the smart contract "Trackside Power" as a single message as shown in the above table. Once such smart contract is received, the execution engine extracts the data to check the status to be used for the own onboard power storage unit 14. When the smart contract data is 1—USE, then the onboard control system 12 is allowed to use the onboard energy to drive the vehicle for the particular distance. When the data value is set as "0—Don't USE", the vehicle 10 gets the needed power from the power feeding segments and it is not allowed to use the onboard energy. However, it is allowed to store the regenerative energy automatically without the need for additional command or consensus, if there is space available in the unit 14. Accordingly, for example a suitable relay is activated to switch to onboard energy or not in the form of smart subcontracts.

In general, all "smart contracts" above described are time bound, and after a configurable time limit from the reception of smart contracts, they are no longer valid.

Hence, it is evident from the foregoing description and appended claims that the system 1 and method 200 according to the present invention, achieve the intended aim since they allow to manage the movement of the vehicles and the related power needed, either from the power line or from the onboard storage units, in a more efficient and better integrated way, where the movement instructions and the related powering instructions are generated and issued timely, in a coordinated way, substantially before the vehicle reaches the relevant power feeding instructions, with execution times defined in advance.

The system 1 and method 200 thus conceived are susceptible of modifications and variations, all of which are within the scope of the inventive concept as defined in particular by the appended claims; for example, some parts of the control system 30, the power feeding control units 20, and on board control system 12 may reside each on a same electronic unit, or they can even be realized as subparts of a same component or circuit of an electronic unit, or they can be placed remotely from each other and in operative communication there between; the various processing unit and/or execution engines can comprise a processor, or a processor-based device or controller, and can comprise any suitable type of commercially available processor or microprocessor suitably programmed with software, to the extent needed accompanied with suitable circuitry, for performing the functionalities they are devised for.

All the details may furthermore be replaced with technically equivalent elements.

What is claimed is:

1. A system for managing the movement of a vehicle travelling along a transport network and powered by a power line which is segmented into a plurality of power feeding segments, the system comprising:
   at least one power feeding controller configured at least to control switching ON/OFF a predetermined number of power feeding segments;
   an on-board control system installed on board of said vehicle;
   at least one trackside control system which is operatively connected to said on-board control system and said at least one power feeding controller; wherein said trackside control system is configured at least to generate:
   a first set of movement instructions to be executed by said on-board control system for the vehicle to reach and travel over said predetermined number of power feeding segments, said first set of movement instructions including one or more first bounding instructions indicative of a time frame within which said first set of movement instructions has to be executed; and, based on said first set of movement instructions,
   a second set of powering instructions to be executed by said at least one controller to switch ON one or more of said predetermined number of power feeding segments for powering the vehicle when transiting over the one or more power feeding segments switched ON, said second set of powering instructions including one or more second bounding instructions indicative of a time frame within which said one or more power segments have to be switched ON,
   wherein said at least one power feeding controller is further configured to monitor said predetermined number of power feeding segments and to output to said trackside control system a warning signal if one or more of said predetermined power feeding segments under its control are under fault, and
   wherein the system further comprises at least one rechargeable power storage which is installed on the board of said vehicle, said power storage being configured to collect and store power while the vehicle is travelling along the transport network, and wherein said trackside control system is further configured to generate, based on said warning signal, a third set of powering instructions to be executed by said on-board control system for powering the vehicle, via the energy stored in the rechargeable power storage, said third set of powering instructions including one or more third bounding instructions indicative of a time frame within which the vehicle has to be fed with the power stored in the rechargeable power storage.

2. The system as in claim 1, wherein said trackside control system is configured to generate said first set of movement instructions and said second set of powering instructions before the vehicle reaches said predetermined number of power feeding segments.

3. The system as in claim 1, wherein the on-board control system comprises a navigation software module for driving the movement of the vehicle and the trackside control system comprises a copy of said navigation software module.

4. The system as in claim 1, wherein the system comprises at least one rechargeable power storage which is installed on board of said vehicle, said power storage being configured to collect and store power while the vehicle is travelling along the transport network, said trackside control system being further configured to generate, based on a signal issued by the onboard control system requesting to use the energy stored in the rechargeable power storage, a third set of powering instructions to be executed by said on-board control system for powering the vehicle via the energy stored in the rechargeable power storage, said third set of powering instructions including one or more third bounding instructions indicative of a time frame within which the vehicle has to be fed with the power stored in the rechargeable power storage.

5. The system as in claim 1 further comprising at least one localizing device configured to provide signals indicative of the actual position of the vehicle along the transport network to at least one of the on-board control system and the trackside control system.

6. The system as in claim 5, wherein said at least one trackside control system is configured to generate said first and/or second set of instructions and/or to modify a previously generated first and/or second set of instructions in real time based on a received signal indicative of the actual localization of the vehicle along the transport network and on a predetermined travelling time schedule defined for said vehicle.

7. The system as in claim 5, wherein the at least one localizing device comprises a plurality of trackside beacons installed, along the transport network spaced apart from each other.

8. The system as in claim 7, wherein said trackside control system comprises a database storing data indicative of the identification and positioning of each trackside beacon installed along the transport network.

9. The system as in claim 8, wherein said on-board control system comprises an accelerometer for providing signals indicative of the actual acceleration of the vehicle and a software module which is configured to calculate based at least on the signals provided by the accelerometer the actual distance travelled by the vehicle with reference to a previously identified trackside beacon.

10. The system as in claim 5, wherein said at least one localizing device comprises a first beacon and a second beacon which are installed on board of the vehicle at a front part and at a respective rear part thereof.

11. The system as in claim 1, wherein said trackside control system is configured to generate at least one of said first set of movement instructions, second set of powering instructions and third set of powering instructions in the form of blockchain-based smart contracts.

12. A method for managing the movement of a vehicle travelling along a transport network and powered by a power line which is segmented into a plurality of power feeding segments, the method comprising at least the following steps:

generating, via at least one trackside control system, a first set of movement instructions, to be executed by an on-board control system installed on board of said vehicle, for the vehicle to reach and travel over a predetermined number of power feeding segments, said first set of movement instructions including one or more first bounding instructions indicative of a time frame within which said first set of movement instructions has to be executed; and, based on said first set of movement instructions, further generating, via the trackside control system, a second set of powering instructions to be executed, by at least one controller configured at least to control switching ON/OFF of said predetermined number of power feeding segments, to switch ON one or more of said predetermined number of power feeding segments for powering the vehicle when transiting over the one or more power feeding segments switched ON, said second set of powering instructions including one or more second bounding instructions indicative of a time frame within which said one or more power segments have to be switched ON, wherein said at least one power feeding controller is further configured to monitor said predetermined number of power feeding segments and to output to said trackside control system a warning signal if one or more of said predetermined power feeding segments under its control are under fault, and wherein the system comprises at least one rechargeable power storage which is installed on board of said vehicle, said power storage being configured to collect and store power while the vehicle is travelling along the transport network, and wherein said trackside control system is further configured to generate, based on said warning signal, a third set of powering instructions to be executed by said on-board control system for powering the vehicle, via the energy stored in the rechargeable power storage, said third set of powering instructions including one or more third bounding instructions indicative of a time frame within which the vehicle has to be fed with the power stored in the rechargeable power storage.

* * * * *